United States Patent
Ok et al.

(10) Patent No.: US 11,434,358 B2
(45) Date of Patent: Sep. 6, 2022

(54) MATRIX COPOLYMER, GRAFT COPOLYMER, AND THERMOPLASTIC RESIN COMPOSITION

(71) Applicant: LG CHEM, LTD., Seoul (KR)

(72) Inventors: Hye Jeong Ok, Daejeon (KR); Seok Goo Jang, Daejeon (KR); Sang Hoo Park, Daejeon (KR); Hyung Seop Shim, Daejeon (KR); Jeong Su Choi, Daejeon (KR); Keun Hoon Yoo, Daejeon (KR); Won Seok Lee, Daejeon (KR); Roo Da Lee, Daejeon (KR); Ho Hoon Kim, Daejeon (KR); Jong Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 203 days.

(21) Appl. No.: 16/646,127

(22) PCT Filed: May 14, 2019

(86) PCT No.: PCT/KR2019/005562
§ 371 (c)(1),
(2) Date: Mar. 10, 2020

(87) PCT Pub. No.: WO2019/221448
PCT Pub. Date: Nov. 21, 2019

(65) Prior Publication Data
US 2020/0270442 A1    Aug. 27, 2020

(30) Foreign Application Priority Data

| May 14, 2018 | (KR) | 10-2018-0054988 |
| May 14, 2018 | (KR) | 10-2018-0054989 |
| May 14, 2018 | (KR) | 10-2018-0054990 |
| May 14, 2019 | (KR) | 10-2019-0055975 |

(51) Int. Cl.
| C08F 251/02 | (2006.01) |
| C08L 33/12 | (2006.01) |
| C08F 220/14 | (2006.01) |
| C08F 279/02 | (2006.01) |
| C08L 47/00 | (2006.01) |

(52) U.S. Cl.
CPC ............ C08L 33/12 (2013.01); C08F 220/14 (2013.01); C08F 279/02 (2013.01); C08L 47/00 (2013.01)

(58) Field of Classification Search
CPC .................................................... C08F 251/02
See application file for complete search history.

(56) References Cited

U.S. PATENT DOCUMENTS

| 3,787,522 | A | 1/1974 | Dickie et al. | |
| 7,935,745 | B2 | 5/2011 | Weder et al. | |
| 2006/0041062 | A1* | 2/2006 | Choi | C08F 285/00 525/63 |
| 2007/0078221 | A1* | 4/2007 | Choi | C08F 279/02 525/70 |
| 2013/0171439 | A1* | 7/2013 | Shoseyov | C08J 9/28 428/220 |
| 2018/0134889 | A1 | 5/2018 | Lee et al. | |

FOREIGN PATENT DOCUMENTS

| CN | 106519122 A | | 3/2017 |
| CN | 107141387 A | * | 9/2017 |
| EP | 0703252 B1 | | 12/2001 |
| EP | 3287492 A1 | | 2/2018 |
| JP | S6342940 A | | 2/1988 |
| KR | 20050020200 A | | 3/2005 |
| KR | 20050038453 A | | 4/2005 |
| KR | 20070027991 A | | 3/2007 |
| KR | 20130141475 A | | 12/2013 |
| KR | 20160081497 A | | 7/2016 |
| WO | WO2017079497 A1 | | 5/2017 |

OTHER PUBLICATIONS

Search Report dated Aug. 5, 2020 for European Application No. 19802659.3.
Xie et al., "Applications of Cellulose Nanocrystals: A Review," Engineered Science, Jan. 1, 2018, pp. 4-16.
International Search Report dated Aug. 21, 2019 for International Patent Application No. PCT/KR2019/005562.

* cited by examiner

*Primary Examiner* — Mark S Kaucher

(57) ABSTRACT

The present invention relates to a matrix copolymer including a cellulose nanocrystal derivative, an alkyl (meth)acrylate-based monomer unit, an aromatic vinyl-based monomer unit, and a vinyl cyan-based monomer unit; a graft copolymer including a cellulose nanocrystal derivative, a conjugated diene-based polymer, an alkyl (meth)acrylate-based monomer unit, an aromatic vinyl-based monomer unit, and a vinyl cyan-based monomer unit; and a thermoplastic resin composition including at least one thereof. In accordance with the present invention, provided is a thermoplastic resin composition having improved processability, impact strength, tensile strength and chemical resistance while maintaining transparency.

10 Claims, No Drawings

MATRIX COPOLYMER, GRAFT COPOLYMER, AND THERMOPLASTIC RESIN COMPOSITION

TECHNICAL FIELD

Cross-Reference to Related Applications

The present specification is a U.S. National Stage of International Patent Application No. PCT/KR2019/005562 filed May 14, 2019, which claims priority to and the benefit of Korean Patent Applications Nos. 10-2018-0054988, 10-2018-0054989, and 10-2018-0054990, filed on May 14, 2018, and Korean Patent Application No. 10-2019-0055975, filed on May 14, 2019, in the Korean Intellectual Property Office entire contents of which are incorporated herein by reference.

TECHNICAL FIELD

The present invention relates to a matrix copolymer, a graft copolymer, and a thermoplastic resin composition, and more particularly, to a matrix copolymer, graft copolymer, and thermoplastic resin composition including a cellulose nanocrystal derivative.

BACKGROUND ART

A transparent thermoplastic resin composition is prepared by extruding a transparent graft copolymer and a transparent matrix copolymer. The transparency of a thermoplastic resin-molded article is improved as the refractive index of a transparent graft copolymer coincides with the refractive index of a transparent matrix copolymer.

Meanwhile, in a transparent matrix copolymer and a transparent graft copolymer, a methyl methacrylate unit with a low refractive index among components thereof is included in the highest content therein. Such a methyl methacrylate unit serves to improve the transparency of a transparent matrix copolymer, but deteriorates chemical resistance. In addition, since a methyl methacrylate unit is pyrolyzed at a high temperature of 300° C. or higher, the color or thermal stability of a final product may be deteriorated.

Accordingly, research into developing a transparent matrix copolymer and transparent graft copolymer having both excellent transparency and excellent chemical resistance is underway.

DISCLOSURE

Technical Problem

The present invention is directed to providing a matrix copolymer, graft copolymer, and thermoplastic resin composition having excellent transparency, chemical resistance, and mechanical characteristics.

Technical Solution

In accordance with an aspect of the present invention, the above and other objects can be accomplished by the provision of a matrix copolymer, including a cellulose nanocrystal derivative; an alkyl (meth)acrylate-based monomer unit; an aromatic vinyl-based monomer unit; and a vinyl cyan-based monomer unit.

In accordance with another aspect of the present invention, there is provided a method of preparing a matrix copolymer, the method including adding a cellulose nanocrystal, an alkyl (meth)acrylate-based monomer, an aromatic vinyl-based monomer, and a vinyl cyan-based monomer into a reactor and polymerizing the same.

In accordance with still another aspect of the present invention, there is provided a graft copolymer, including a cellulose nanocrystal derivative; a conjugated diene-based polymer; an alkyl (meth)acrylate-based monomer unit; an aromatic vinyl-based monomer unit; and a vinyl cyan-based monomer unit.

In accordance with still another aspect of the present invention, there is provided a method of preparing a graft copolymer, the method including adding a cellulose nanocrystal, a conjugated diene-based polymer, an alkyl (meth)acrylate-based monomer, an aromatic vinyl-based monomer, and a vinyl cyan-based monomer into a reactor and graft-polymerizing the same.

In accordance with yet another aspect of the present invention, there is provided a thermoplastic resin composition, including a matrix copolymer including an alkyl (meth)acrylate-based monomer unit, an aromatic vinyl-based monomer unit, and a vinyl cyan-based monomer unit; and a graft copolymer including a conjugated diene-based polymer, an alkyl (meth)acrylate-based monomer unit, an aromatic vinyl-based monomer unit, and a vinyl cyan-based monomer unit, wherein at least one of the matrix copolymer and the graft copolymer further includes a cellulose nanocrystal derivative.

Advantageous Effects

As apparent from the above description, a matrix copolymer, graft copolymer, and thermoplastic resin composition of the present invention include a cellulose nanocrystal derivative, thereby further improving chemical resistance, impact strength, and tensile strength while maintaining transparency at the same level as in conventional cases.

In addition, a cellulose nanocrystal derivative included in the matrix copolymer and graft copolymer of the present invention can partially replace an alkyl (meth)acrylate-based monomer unit, thereby minimizing a chemical resistance decrease caused by an alkyl (meth)acrylate-based monomer unit.

Further, an aromatic vinyl-based monomer unit can be included in a large amount, compared to conventional cases, due to a low refractive index of a cellulose nanocrystal derivative included in the matrix copolymer and graft copolymer of the present invention, thereby further improving processability.

MODES OF THE INVENTION

Now, the present invention will be described in more detail to facilitate understanding of the present invention.

Terms or words used in the specification and the following claims shall not be limited to common or dictionary meanings, and have meanings and concepts corresponding to technical aspects of the embodiments of the present invention so as to most suitably express the embodiments of the present invention.

In the present invention, a cellulose nanocrystal (CNC) may be obtained by chemically processing cellulose. Cellulose may be composed of a crystal region and an amorphous region. When an acid is applied to cellulose, hydronium ions ($H_3O^+$) penetrate into an amorphous region in which molecules are arranged in a relatively irregular manner. The penetrated hydronium ions promote hydrolysis of glycosidic bonds, thereby producing a cellulose nanocrystal, an amorphous region of which has been converted into a crystal region. Here, the acid may be one or more selected from the group consisting of hydrochloric acid, sulfuric acid, phosphoric acid, hydrobromic acid, and nitric acid. Thereamong, sulfuric acid is preferred.

In the present invention, the cellulose nanocrystal may have a refractive index of 1.4 to 1.5 or 1.42 to 1.48. Thereamong, a refractive index of 1.42 to 1.48 is preferred. When the ranges are satisfied, the transparency of a copolymer may be maintained at the same level as in conventional cases.

In the present invention, the cellulose nanocrystal may be composed of secondary particles including a plurality of primary particles. Here, the primary particles may refer to single crystals of cellulose nanocrystals, and the secondary particles may refer to assemblies of a plurality of single crystals of cellulose nanocrystals.

An average diameter of primary particles of the cellulose nanocrystals may be 5 to 20 nm or 9 to 14 nm. Thereamong, an average diameter of 9 to 14 nm is preferred. When the ranges are satisfied, the chemical resistance and the mechanical characteristics of the matrix copolymer or the graft copolymer may be further improved. An average length of primary particles of the cellulose nanocrystals may be 50 to 200 nm or 100 to 150 nm. Thereamong, an average length of 100 to 150 nm is preferred. When the ranges are satisfied, the chemical resistance and the mechanical characteristics of the matrix copolymer or the graft copolymer may be further improved.

Here, an average diameter and average length of primary particles of the cellulose nanocrystals may be measured using a transmission electron microscope (TEM).

An average diameter of secondary particles of the cellulose nanocrystals may be 100 to 200 nm or 125 to 175 nm. Thereamong, an average diameter of 125 to 175 nm is preferred. When the ranges are satisfied, the chemical resistance, impact resistance, and tensile strength of the matrix copolymer or the graft copolymer may be further improved.

Here, an average particle diameter of secondary particles of the cellulose nanocrystals may refer to an average hydrodynamic diameter. An average particle diameter of secondary particles of the cellulose nanocrystals may be measured using a dynamic light scattering (DLS) method. In particular, the average particle diameter may be measured using Zetasizer model Nano-Zs (trade name, manufacturer: Malvern).

The cellulose nanocrystal may have a crystallinity index of 70% to 90% or 75% to 85%. Thereamong, a crystallinity index of 75% to 85% is preferred. When the ranges are satisfied, the cellulose nanocrystal may be more uniformly dispersed in a polymerization solution.

Here, a crystallinity index of the cellulose nanocrystal may be measured by the Segal method.

The cellulose nanocrystal may be fed in the form of a solution of being mixed with an aqueous solvent during a preparation process to be uniformly dispersed in a polymerization solution so as to prepare a matrix copolymer or a graft copolymer.

A weight ratio of the cellulose nanocrystal to the aqueous solvent may be 5:95 to 15:85 or 5:95 to 10:90. Thereamong, a weight ratio of 5:95 to 10:90 is preferred. When the ranges are satisfied, the cellulose nanocrystal may be more uniformly dispersed in a polymerization solution.

The aqueous solvent may be water. Particularly, reverse osmosis water is preferred.

The zeta potential of a cellulose nanocrystal in the solution may be −45 mV to −25 mV or −40 mV to −30 mV. Thereamong, a zeta potential of −40 mV to −30 mV is preferred. When the conditions are satisfied, the dispersion stability of the cellulose nanocrystal solution may be further improved. In addition, when the cellulose nanocrystal solution is added to a polymerization solution, more uniform dispersion may be accomplished.

Here, the zeta potential of the cellulose nanocrystal may be measured by a DLS method using Zetasizer model Nano-Zs (trade name, manufacturer: Malvern).

In the present invention, the cellulose nanocrystal may be directly manufactured, or commercially available materials may be used. As commercially available materials, BGB Ultra™ Cellulose Nanocrystals Suspension manufactured by Blue Goose Biorefineries Inc. may be used.

In the present invention, a refractive index refers to an absolute refractive index of a material. A refractive index may be recognized as a ratio of the velocity of an electromagnetic radiation ray in free space to the velocity of the radiation ray in a material. Here, the radiation ray may be a visible ray having a wavelength of 450 nm to 680 nm, particularly a visible ray having a wavelength of 589.3 nm. The refractive index may be measured using a known method, i.e., using an Abbe Refractometer.

In the present invention, the weight average molecular weight of the matrix copolymer may be measured as a relative value to a standard polystyrene (PS) sample using tetrahydrofuran (THF) and gel permeation chromatography (GPC, Waters Breeze).

In the present invention, a graft ratio of the graft copolymer may be calculated using the following equation after adding a predetermined amount of the graft copolymer in acetone and vibrating the same for 24 hours to dissolve the free graft copolymer, and then centrifuging the resultant product for 1 hour by means of a centrifuge to separate a supernatant (sol), and then vacuum-drying a precipitate (gel) at 140° C. for 2 hours to obtain an insoluble fraction:

$$\text{Graft ratio (\%)} = [(Y-(X \times R))/(X \times R)] \times 100$$

X: Weight of graft copolymer added to obtain insoluble fraction

Y: Weight of insoluble fraction

R: Fraction of butadiene rubber polymer in graft copolymer added to obtain insoluble fraction In the present invention, the weight average molecular weight (g/mol) of shells of the graft copolymer may be obtained by means of a GPC instrument (manufacturer: Waters) after drying a sol, separated according to the graft ratio measurement method, in a 50° C. hot air oven, dissolving the dried sol in a THF solution to prepare a solution (concentration: 0.1% by weight), and filtering the prepared solution using a 0.1 μm filter.

In the present invention, a conjugated diene-based polymer may be a conjugated diene-based rubber polymer. The conjugated diene-based monomer may be prepared through the polymerization, preferably emulsion polymerization. The conjugated diene-based monomer may be one or more selected from the group consisting of 1,3-butadiene, isoprene, chloroprene, and piperylene. Thereamong, 1,3-butadiene is preferred.

In the present invention, an alkyl (meth)acrylate-based monomer unit may be a unit derived from an alkyl (meth)acrylate-based monomer. The alkyl (meth)acrylate-based monomer may be one or more selected from the group consisting of methyl (meth)acrylate, ethyl (meth)acrylate, propyl (meth)acrylate, 2-ethylhexyl (meth)acrylate, decyl (meth)acrylate, and lauryl (meth)acrylate. Thereamong, methyl methacrylate is preferred.

In the present invention, an aromatic vinyl-based monomer unit may be a unit derived from an aromatic vinyl-based monomer. The aromatic vinyl-based monomer may be one or more selected from the group consisting of styrene, α-methyl styrene, α-ethyl styrene, and p-methyl styrene. Thereamong, styrene is preferred.

In the present invention, a vinyl cyan-based monomer unit may be a unit derived from a vinyl cyan-based monomer. The vinyl cyan-based monomer may be one or more selected from the group consisting of acrylonitrile, methacrylonitrile, phenyl acrylonitrile, and α-chloroacrylonitrile. Thereamong, acrylonitrile is preferred.

1. Matrix Copolymer

A matrix copolymer according to an embodiment of the present invention includes 1) a cellulose nanocrystal derivative; 2) an alkyl (meth)acrylate-based monomer unit; 3) an aromatic vinyl-based monomer unit; and 4) a vinyl cyan-based monomer unit.

Meanwhile, a refractive index of the matrix copolymer according to an embodiment of the present invention may be 1.51 to 1.52 or 1.512 to 1.518. Thereamong, a refractive index of 1.512 to 1.518 is preferred. When the ranges are satisfied, the refractive index of the matrix copolymer coincides with a refractive index of a graft copolymer including a conjugated diene-based polymer, an alkyl (meth)acrylate-based monomer unit, an aromatic vinyl-based monomer unit, and a vinyl cyan-based monomer unit and thus a transparent thermoplastic resin-molded article may be manufactured.

Meanwhile, a weight average molecular weight of the matrix copolymer according to an embodiment of the present invention may be 80,000 to 150,000 g/mol or 90,000 to 120,000 g/mol. Thereamong, a weight average molecular weight of 90,000 to 120,000 g/mol is preferred. When the ranges are satisfied, mechanical characteristics, particularly impact strength, may be improved.

Hereinafter, components of the matrix copolymer according to an embodiment of the present invention are described in detail.

1) Cellulose Nanocrystal Derivative

A cellulose nanocrystal derivative may be formed through a reaction between a cellulose nanocrystal and one or more selected from the group consisting of an alkyl (meth)acrylate-based monomer, an aromatic vinyl-based monomer, and a vinyl cyan-based monomer added during preparation of a matrix copolymer.

The cellulose nanocrystal derivative may further improve the chemical resistance, impact resistance, and tensile strength of a copolymer while not affecting the transparency of a matrix copolymer.

The cellulose nanocrystal derivative may partially replace an alkyl (meth)acrylate-based monomer unit, thereby minimizing a chemical resistance decrease in a copolymer due to an alkyl (meth)acrylate monomer unit.

In addition, the transparency of the matrix copolymer may be maintained due to the cellulose nanocrystal derivative with a relatively low refractive index. Further, the matrix copolymer may include the aromatic vinyl-based monomer unit in a high content compared to the conventional cases, thereby maintaining processability at the same level as in conventional cases.

The matrix copolymer may include the cellulose nanocrystal derivative and the alkyl (meth)acrylate-based monomer unit in a weight ratio of 1:99 to 20:80, 2:98 to 15:85 or 2:98 to 12:88. Thereamong, a weight ratio of 2:98 to 12:88 is preferred. When the ranges are satisfied, the cellulose nanocrystal derivative may partially replace the alkyl (meth)acrylate-based monomer unit in a range in which the transparency of the copolymer is not affected. Accordingly, a chemical resistance decrease caused by the alkyl (meth)acrylate-based monomer unit may be minimized.

The matrix copolymer may include the cellulose nanocrystal derivative and the aromatic vinyl-based monomer unit in a weight ratio of 5:95 to 35:65, 7:93 to 30:70 or 7:93 to 25:75. Thereamong, a weight ratio of 7:93 to 25:75 is preferred. When the ranges are satisfied, the processability of the matrix copolymer may be further improved while preventing a transparency decrease in the copolymer due to the cellulose nanocrystal derivative with a low refractive index.

The cellulose nanocrystal derivative may be included in an amount of 0.1 to 15% by weight, 1 to 12% by weight, or 2 to 9% by weight based on a total weight of the matrix copolymer. Thereamong, an amount of 2 to 9% by weight is preferred. When the ranges are satisfied, the chemical resistance and mechanical characteristics of the matrix copolymer may be further improved while not affecting the transparency thereof 2) Alkyl (Meth)Acrylate-Based Monomer Unit An alkyl (meth)acrylate-based monomer unit may impart excellent transparency to the matrix copolymer.

The alkyl (meth)acrylate-based monomer unit may be included in an amount of 50 to 75% by weight, 52 to 72% by weight, or 55 to 70% by weight based on a total weight of the matrix copolymer. Thereamong, an amount of 55 to 70% by weight is preferred. When the ranges are satisfied, the transparency of the copolymer may be further improved.

3) Aromatic Vinyl-Based Monomer Unit

The aromatic vinyl-based monomer unit may impart excellent processability, rigidity, and impact resistance to the matrix copolymer.

The aromatic vinyl-based monomer unit may be included in an amount of 15 to 35% by weight, 17 to 32% by weight, or 20 to 30% by weight based on a total weight of the matrix copolymer. Thereamong, an amount of 20 to 30% by weight is preferred. When the ranges are satisfied, the rigidity, the impact resistance and processability of the copolymer may be further improved.

4) Vinyl Cyan-Based Monomer Unit

The vinyl cyan-based monomer unit may impart excellent chemical resistance to the matrix copolymer.

The vinyl cyan-based monomer unit may be included in an amount of 1 to 15% by weight, 3 to 12% by weight, or 5 to 10% by weight based on a total weight of the matrix copolymer. Thereamong, an amount of 5 to 10% by weight is preferred. When the ranges are satisfied, the chemical resistance of the matrix copolymer may be further improved.

2. Matrix Copolymer Preparation Method

The matrix copolymer according to an embodiment of the present invention is prepared by adding a cellulose nanocrystal, an alkyl (meth)acrylate-based monomer, an aromatic vinyl-based monomer, and a vinyl cyan-based monomer into a reactor and polymerizing the same.

The cellulose nanocrystal may be added in a solution state of mixed with a solvent during a graft copolymer preparation process for uniform dispersion in the polymerization solution.

In the matrix copolymer preparation method, a weight ratio of the cellulose nanocrystal to the alkyl (meth)acrylate-based monomer may be 1:99 to 20:80, 2:98 to 15:85 or 2:98 to 12:88. Thereamong, a weight ratio of 2:98 to 12:88 is preferred. When the ranges are satisfied, the cellulose nanocrystal may partially replace the alkyl (meth)acrylate-based monomer in a range in which the transparency of the matrix copolymer is not affected. Accordingly, the content of the alkyl (meth)acrylate-based monomer unit in the matrix copolymer may be reduced, thereby minimizing a chemical resistance decrease.

In the matrix copolymer preparation method, a weight ratio of the cellulose nanocrystal to the aromatic vinyl-based monomer may be 5:95 to 35:65, 7:93 to 30:70 or 7:93 to 25:75. Thereamong, a weight ratio of 7:93 to 25:75 is preferred. When the ranges are satisfied, the processability of the matrix copolymer may be further improved while preventing a transparency decrease in the matrix copolymer due to the cellulose nanocrystal with a low refractive index.

The cellulose nanocrystal may be added in an amount of 0.1 to 15% by weight, 1 to 12% by weight, or 2 to 9% by weight based on a total weight of the cellulose nanocrystal, the alkyl (meth)acrylate-based monomer, the aromatic vinyl-based monomer, and the vinyl cyan-based monomer. Thereamong, an amount of 2 to 9% by weight is preferred. When the ranges are satisfied, the chemical resistance and mechanical characteristics of the matrix copolymer may be further improved while not affecting the transparency thereof.

The alkyl (meth)acrylate-based monomer may be added in an amount of 50 to 75% by weight, 52 to 72% by weight, or 55 to 70% by weight based on a total weight of the cellulose nanocrystal, the alkyl (meth)acrylate-based monomer, the aromatic vinyl-based monomer, and the vinyl cyan-based monomer. Thereamong, an amount of 55 to 70% by weight is preferred. When the ranges are satisfied, the transparency of the copolymer may be further improved.

The aromatic vinyl-based monomer may be added in an amount of 15 to 35% by weight, 17 to 32% by weight, or 20 to 30% by weight based on a total weight of the cellulose nanocrystal, the alkyl (meth)acrylate-based monomer, the aromatic vinyl-based monomer, and the vinyl cyan-based monomer. Thereamong, an amount of 20 to 30% by weight is preferred. When the ranges are satisfied, the rigidity, impact resistance, and processability of the matrix copolymer may be further improved.

The vinyl cyan-based monomer may be added in an amount of 1 to 15% by weight, 3 to 12% by weight, or 5 to 10% by weight based on a total weight of the cellulose nanocrystal, the alkyl (meth)acrylate-based monomer, the aromatic vinyl-based monomer, and the vinyl cyan-based monomer. Thereamong, an amount of 5 to 10% by weight is preferred. When the ranges are satisfied, the chemical resistance of the matrix copolymer may be further improved.

Descriptions of the cellulose nanocrystal, the alkyl (meth)acrylate-based monomer, the aromatic vinyl-based monomer, and the vinyl cyan-based monomer are the same as the descriptions of the cellulose nanocrystal derivative, the alkyl (meth)acrylate-based monomer unit, the aromatic vinyl-based monomer unit, and the vinyl cyan-based monomer unit.

Meanwhile, a matrix copolymer preparation method according to another embodiment of the present invention may include a step of adding the alkyl (meth)acrylate-based monomer, the aromatic vinyl-based monomer, and the vinyl cyan-based monomer into a reactor and polymerizing the same (step 1); and a step of adding the cellulose nanocrystal into the reactor and allowing a reaction to occur (step 2).

Hereinafter, steps 1 and 2 are described in detail.

1) Step 1

Step 1 may be a step of adding an alkyl (meth)acrylate-based monomer, an aromatic vinyl-based monomer, and a vinyl cyan-based monomer into a reactor and polymerizing the same.

The polymerization may be bulk polymerization or suspension polymerization. Thereamong, bulk polymerization allowing preparation of a high-purity copolymer is preferred.

In step 1, it is preferred to polymerize the alkyl (meth)acrylate-based monomer, the aromatic vinyl-based monomer, and the vinyl cyan-based monomer while continuously adding the same at a constant rate.

When the monomers are polymerized while continuously adding the same, heat is easily released during the polymerization, and a runaway reaction due to excessive heat generation may be prevented. In addition, the weight average molecular weight and polymerization conversion rate of the copolymer may be appropriately maintained.

The continuous addition and the polymerization may be performed for 1 to 6 hours or 1.5 to 5 hours. Thereamong, 1.5 to 5 hours is preferred. When the conditions are satisfied, a copolymer having a uniform particle size may be prepared, and a stable polymerization conversion rate may be obtained.

The continuous addition and the polymerization may be performed at 100° C. to 180° C. or 110° C. to 170° C. Thereamong, 110° C. to 170° C. is preferred. In addition, the continuous addition and the polymerization are preferably performed at a constant temperature to exhibit an appropriate polymerization rate.

In step 1, it is preferred to further add one or more selected from the group consisting of an initiator, a molecular weight regulator, and a solvent.

Here, it is preferred to continuously add the initiator, the molecular weight regulator, the solvent, and the like along with the aforementioned monomers at a constant rate. When the initiator and the like are continuously added and an appropriate polymerization rate is maintained, a copolymer having a uniform particle size may be prepared.

The initiator may be one or more selected from the group consisting of 1,1-bis(t-butylperoxy)cyclohexane, 1,1-bis(t-butylperoxy)-2-methylcyclohexane, 1,1-bis(t-butylperoxy)-3,3,5-trimethylcyclohexane, and 2,2-bis(t-butylperoxy)butane. Thereamong, 1,1-bis(t-butylperoxy)cyclohexane is preferred.

The initiator may be added in an amount of 0.5 to 3 parts by weight or 0.7 to 1.5 parts by weight based on 100 parts by weight of the sum of the cellulose nanocrystal, the alkyl (meth)acrylate-based monomer, the aromatic vinyl-based monomer, and the vinyl cyan-based monomer. Thereamong, an amount of 0.7 to 1.5 parts by weight is preferred. When the ranges are satisfied, it is possible to balance a polymerization conversion rate of the copolymer with a weight average molecular weight thereof.

The molecular weight regulator may be one or more selected from the group consisting of an α-methyl styrene dimer, t-dodecyl mercaptan, n-dodecyl mercaptan, octyl mercaptan, carbon tetrachloride, methylene chloride, methylene bromide, tetraethylthiuram disulfide, methylene thiuram disulfide, and diisopropyl xanthogen disulfide. Thereamong, t-dodecyl mercaptan is preferred. The molecular weight regulator may be added in an amount of 0.05 to 0.3 part by weight or 0.1 to 0.2 part by weight based on 100 parts by weight of the sum of the cellulose nanocrystal, the alkyl (meth)acrylate-based monomer, the aromatic vinyl-based monomer, and the vinyl cyan-based monomer. Thereamong, an amount of 0.1 to 0.2 part by weight is preferred. When the ranges are satisfied, the polymerization conversion rate of the copolymer may be further improved.

When the copolymer is prepared by bulk polymerization, the solvent may be an inert organic solvent. The solvent may be one or more selected from the group consisting of methyl ethyl ketone, petroleum ether, ethylbenzene, toluene, carbon tetrachloride, and chloroform. Thereamong, toluene is preferred.

The solvent may be added in an amount of 1 to 50 parts by weight or 10 to 40 parts by weight based on 100 parts by weight of the sum of the cellulose nanocrystal, the alkyl (meth)acrylate-based monomer, the aromatic vinyl-based monomer, and the vinyl cyan-based monomer. Thereamong, an amount of 10 to 40 parts by weight is preferred. When the ranges are satisfied, the viscosity of the polymerization solution may be appropriately adjusted, thereby easily performing polymerization.

2) Step 2

Subsequently, the cellulose nanocrystal is fed into the reactor and a reaction is allowed to occur. Particularly, the cellulose nanocrystal may be added when a polymerization conversion rate is 40 to 50% and may react with a polymerized product and unreacted monomers obtained in step 1.

When the cellulose nanocrystal is fed into the reactor in step 2, the cellulose nanocrystal may be uniformly dispersed in a polymerized product and unreacted monomers obtained in step 1. As a result, the cellulose nanocrystal derivative is uniformly distributed in the matrix copolymer, so that a copolymer having all of excellent transparency, chemical resistance, and mechanical characteristics may be prepared.

Meanwhile, the cellulose nanocrystals are polymerized with each other due to inherent characteristics when cellulose nanocrystals are added in step 1, whereby it may be difficult to uniformly disperse the cellulose nanocrystals in the matrix copolymer. However, when the cellulose nanocrystal is added in step 2, it may minimize the polymerization of the cellulose nanocrystals, and an influence of the cellulose nanocrystal on copolymerization of the alkyl (meth) acrylate-based monomer, the aromatic vinyl-based monomer, and the vinyl cyan-based monomer may be minimized.

After adding the cellulose nanocrystal into the reactor, the cellulose nanocrystal may react with a polymerized product and unreacted monomers obtained in step 1 for 1 to 5 hours or 1 to 4 hours. Thereamong, it is preferred to react for 1 to 4 hours. When the conditions are satisfied, the cellulose nanocrystal may be uniformly dispersed and stably exist.

Step 2 may be performed at a higher temperature than the temperature of step 1. Particularly, Step 2 may be performed at a 1° C. to 5° C. higher temperature than the temperature of step 1, but the present invention is not limited thereto.

After completion of step 2, unreacted monomers and the solvent in a polymerized product prepared in step 2 may be volatilized in a devolatilizing tank, thereby separating a copolymer.

3. Graft Copolymer

The graft copolymer according to another embodiment of the present invention includes 1) a cellulose nanocrystal derivative; 2) a conjugated diene-based polymer; 3) an alkyl (meth)acrylate-based monomer unit; 4) an aromatic vinyl-based monomer unit; and 5) a vinyl cyan-based monomer unit.

Meanwhile, the weight average molecular weight of shells of the graft copolymer according to another embodiment of the present invention may be 80,000 to 130,000 g/mol or 90,000 to 120,000 g/mol. Thereamong, a weight average molecular weight of 90,000 to 120,000 g/mol is preferred. When the ranges are satisfied, it is possible to balance the processability of the graft copolymer with the mechanical characteristics thereof.

Meanwhile, the graft copolymer according to another embodiment of the present invention may have a refractive index of 1.51 to 1.52 or 1.512 to 1.518. Thereamong, a refractive index of 1.512 to 1.518 is preferred. When the ranges are satisfied, a graft copolymer having excellent transparency may be prepared.

Hereinafter, components of the graft copolymer according to another embodiment of the present invention are described in detail.

1) Cellulose Nanocrystal Derivative

A cellulose nanocrystal derivative may be formed through a reaction between a cellulose nanocrystal and one or more selected from the group consisting of a conjugated diene-based polymer, an alkyl (meth)acrylate-based monomer, an aromatic vinyl-based monomer, and a vinyl cyan-based monomer added to prepare a graft copolymer.

The cellulose nanocrystal derivative may significantly improve the chemical resistance and mechanical characteristics of the graft copolymer. The cellulose nanocrystal derivative may partially replace an alkyl (meth)acrylate-based monomer unit, thereby minimizing a chemical resistance decrease in a copolymer due to an alkyl (meth)acrylate monomer unit. In addition, the transparency of the graft copolymer may be maintained due to the cellulose nanocrystal derivative with a relatively low refractive index. Further, the graft copolymer may include the aromatic vinyl-based monomer unit in a high content compared to the conventional cases, thereby maintaining processability at the same level as in conventional cases.

The graft copolymer may include the cellulose nanocrystal derivative and the alkyl (meth)acrylate-based monomer unit in a weight ratio of 1:99 to 30:70, 2:98 to 25:75 or 3:97 to 20:80. Thereamong, a weight ratio of 3:97 to 20:80 is preferred. When the ranges are satisfied, the cellulose nanocrystal derivative may partially replace the alkyl (meth)acrylate-based monomer unit in a range in which the transparency of the graft copolymer is not affected. Accordingly, a chemical resistance decrease caused by the alkyl (meth) acrylate-based monomer unit may be minimized.

The graft copolymer may include the cellulose nanocrystal derivative and the aromatic vinyl-based monomer unit in a weight ratio of 1:99 to 40:60, 3:97 to 35:65, 5:95 to 30:70 or 8:92 to 25:75. Thereamong, a weight ratio of 8:92 to 25:75 is preferred. When the ranges are satisfied, the processability of the graft copolymer may be further improved while preventing a transparency decrease in the copolymer due to the cellulose nanocrystal derivative with a low refractive index.

The cellulose nanocrystal derivative may be included in an amount of 0.1 to 10% by weight, 0.5 to 8% by weight, or 1 to 5% by weight based on a total weight of the graft copolymer. Thereamong, an amount of 1 to 5% by weight is preferred. When the ranges are satisfied, the chemical resistance and mechanical characteristics of the graft copolymer may be further improved while not affecting the transparency thereof.

2) Conjugated Diene-Based Polymer

A conjugated diene-based polymer may include a conjugated diene-based polymer modified by graft-copolymerizing a conjugated diene-based polymer with an alkyl (meth) acrylate-based monomer, an aromatic vinyl-based monomer, and a vinyl cyan-based monomer; and a conjugated diene-based polymer modified by reacting a conjugated diene-based polymer with a cellulose nanocrystal.

The conjugated diene-based polymer may have an average particle diameter of 0.05 to 0.5 µm or 0.1 to 0.4 µm. Thereamong, an average particle diameter of 0.1 to 0.4 µm is preferred. When the ranges are satisfied, a graft copolymer having both excellent mechanical characteristics and surface gloss characteristics may be prepared.

The conjugated diene-based polymer may be included in an amount of 40 to 60% by weight, 42 to 57% by weight, or 45 to 55% by weight based on a total weight of the graft copolymer. Thereamong, an amount of 45 to 55% by weight is preferred. When the ranges are satisfied, the rigidity, mechanical characteristics, processability, and surface gloss characteristics of the graft copolymer may be further improved.

3) Alkyl (Meth)Acrylate-Based Monomer Unit

An alkyl (meth)acrylate-based monomer unit may impart excellent transparency to the graft copolymer.

The alkyl (meth)acrylate-based monomer unit may be included in an amount of 15 to 40% by weight, 17 to 37% by weight, or 20 to 35% by weight based on a total weight of the graft copolymer. Thereamong, an amount of 20 to 35% by weight is preferred. When the ranges are satisfied, the transparency of the graft copolymer may be further improved.

4) Aromatic Vinyl-Based Monomer Unit

An aromatic vinyl-based monomer unit may impart processability, rigidity, and mechanical characteristics to the graft copolymer.

The aromatic vinyl-based monomer unit may be included in an amount of 5 to 20% by weight, 7 to 17% by weight, or 10 to 15% by weight based on a total weight of the graft copolymer. Thereamong, an amount of 10 to 15% by weight is preferred. When the ranges are satisfied, the processability, rigidity, and mechanical characteristics of the graft copolymer may be further improved.

5) Vinyl Cyan-Based Monomer Unit

A vinyl cyan-based monomer unit may impart excellent chemical resistance to the graft copolymer.

The vinyl cyan-based monomer unit may be included in an amount of 1 to 15% by weight, 3 to 12% by weight, or 5 to 10% by weight based on a total weight of the graft copolymer. Thereamong, an amount of 5 to 10% by weight is preferred. When the ranges are satisfied, the chemical resistance of the graft copolymer may be further improved.

4. Graft Copolymer Preparation Method

The graft copolymer according to another embodiment of the present invention is prepared by adding a cellulose nanocrystal, a conjugated diene-based polymer, an alkyl (meth)acrylate-based monomer, an aromatic vinyl-based monomer, and a vinyl cyan-based monomer into a reactor and polymerizing the same.

In the graft copolymer preparation method, a weight ratio of the cellulose nanocrystal and the alkyl (meth)acrylate-based monomer may be 1:99 to 30:70, 2:98 to 25:75, or 3:97 to 20:80. Thereamong, a weight ratio of 3:97 to 20:80 is preferred. When the ranges are satisfied, the cellulose nanocrystal may partially replace the alkyl (meth)acrylate-based monomer in a range in which the transparency of the graft copolymer is not affected. Accordingly, a chemical resistance decrease caused by the alkyl (meth)acrylate-based monomer may be minimized.

In the graft copolymer preparation method, a weight ratio of the cellulose nanocrystal to the aromatic vinyl-based monomer may be 1:99 to 40:60, 3:97 to 35:65, 5:95 to 30:70, or 8:92 to 25:75. Thereamong, a weight ratio of 8:92 to 25:75 is preferred. When the ranges are satisfied, the processability of the graft copolymer may be further improved while preventing a transparency decrease in the graft copolymer due to the cellulose nanocrystal with a low refractive index.

The cellulose nanocrystal may be included in an amount of 0.1 to 10% by weight, 0.5 to 8% by weight, or 1 to 5% by weight based on a total weight of the cellulose nanocrystal, the conjugated diene-based polymer, the alkyl (meth)acrylate-based monomer, the aromatic vinyl-based monomer, and the vinyl cyan-based monomer. Thereamong, an amount of 1 to 5% by weight is preferred. When the ranges are satisfied, the chemical resistance and mechanical characteristics of the graft copolymer may be further improved while not affecting the transparency thereof.

The conjugated diene-based polymer may be included in an amount of 40 to 60% by weight, 42 to 57% by weight, or 45 to 55% by weight based on a total weight of the cellulose nanocrystal, the conjugated diene-based polymer, the alkyl (meth)acrylate-based monomer, the aromatic vinyl-based monomer, and the vinyl cyan-based monomer. Thereamong, an amount of 45 to 55% by weight is preferred. When the ranges are satisfied, the rigidity, mechanical characteristics, processability, and surface gloss characteristics of the graft copolymer may be further improved.

The alkyl (meth)acrylate-based monomer may be included in an amount of 15 to 40% by weight, 17 to 37% by weight, or 20 to 35% by weight based on a total weight of the cellulose nanocrystal, the conjugated diene-based polymer, the alkyl (meth)acrylate-based monomer, the aromatic vinyl-based monomer, and the vinyl cyan-based monomer. Thereamong, an amount of 20 to 35% by weight is preferred. When the ranges are satisfied, the transparency of the graft copolymer may be further improved.

The aromatic vinyl-based monomer may be included in an amount of 5 to 20% by weight, 7 to 17% by weight, or 10 to 15% by weight based on a total weight of the cellulose nanocrystal, the conjugated diene-based polymer, the alkyl (meth)acrylate-based monomer, the aromatic vinyl-based monomer, and the vinyl cyan-based monomer. Thereamong, an amount of 10 to 15% by weight is preferred. When the ranges are satisfied, the processability, rigidity, and mechanical characteristics of the graft copolymer may be further improved.

The vinyl cyan-based monomer may be included in an amount of 1 to 15% by weight, 3 to 12% by weight, or 5 to 10% by weight based on a total weight of the cellulose nanocrystal, the conjugated diene-based polymer, the alkyl (meth)acrylate-based monomer, the aromatic vinyl-based monomer, and the vinyl cyan-based monomer. Thereamong, an amount of 5 to 10% by weight is preferred. When the ranges are satisfied, the chemical resistance of the graft copolymer may be further improved.

Descriptions of the cellulose nanocrystal, the conjugated diene-based polymer, the alkyl (meth)acrylate-based monomer, the aromatic vinyl-based monomer, and the vinyl cyan-based monomer are the same as the descriptions of the cellulose nanocrystal derivative, the alkyl (meth)acrylate-based monomer unit, the aromatic vinyl-based monomer unit, and the vinyl cyan-based monomer unit.

Meanwhile, a graft copolymer preparation method according to another embodiment of the present invention preferably includes a step of adding the conjugated diene-based polymer, the alkyl (meth)acrylate-based monomer, the aromatic vinyl-based monomer, and the vinyl cyan-based monomer into a reactor and polymerizing the same (step 1);

and a step of adding the cellulose nanocrystal into the reactor and allowing a reaction to occur (step 2).

Step 1 may be a step of adding the conjugated diene-based polymer, the alkyl (meth)acrylate-based monomer, the aromatic vinyl-based monomer, and the vinyl cyan-based monomer into a reactor and emulsion-polymerizing the same.

In step 1, it is preferred to polymerize the alkyl (meth) acrylate-based monomer, the aromatic vinyl-based monomer, and the vinyl cyan-based monomer while continuously adding the same at a constant rate after adding the conjugated diene-based polymer into the reactor batchwise. When polymerization is performed in such a manner, heat is easily released during polymerization and a runaway reaction due to excessive heat generation may be prevented.

The continuous addition and the polymerization may be performed for 3 to 7 hours or 4 to 6 hours. Thereamong, 4 to 6 hours is preferred. When the conditions are satisfied, heat may be easily released during polymerization, a runaway reaction due to excessive heat generation may be prevented, and graft-copolymerization may be easily performed.

The continuous addition and the polymerization may be performed at 60° C. to 80° C. or 62° C. to 78° C. Thereamong, 62° C. to 78° C. is preferred. In addition the continuous addition and the polymerization are preferably performed at a constant temperature.

Here, the conjugated diene-based polymer may be a latex form dispersed in water in a colloidal state.

Meanwhile, in step 1, it is preferred to further added one or more selected from the group consisting of an initiator, an emulsifier, a molecular weight regulator, an oxidation-reduction catalyst, and ion-exchange water.

In addition, it is preferred to continuously add one or more selected from the group consisting of an initiator, an emulsifier, a molecular weight regulator, an oxidation-reduction catalyst, and ion-exchange water along with the aforementioned monomers at a constant rate. When the initiator and the like are continuously added, a polymerization rate may be controlled, a runaway reaction due to excessive heat generation may be inhibited, and a copolymer having a uniform particle size may be polymerized.

The initiator may be one or more selected from the group consisting of a peroxide-based initiator and a sulfite-based initiator.

The peroxide-based initiator may be one or more selected from the group consisting of t-butyl peroxide, cumene hydroperoxide, and diisopropylbenzene peroxide. Thereamong, cumene hydroperoxide is preferred. The sulfite-based initiator may be one or more selected from the group consisting of potassium persulfate, sodium persulfate, and ammonium persulfate. Thereamong, potassium persulfate is preferred.

The initiator may be added in an amount of 0.01 to 0.1 part by weight or 0.03 to 0.08 part by weight based on 100 parts by weight of the sum of the conjugated diene-based polymer, the cellulose nanocrystal, the alkyl (meth)acrylate-based monomer, the aromatic vinyl-based monomer, and the vinyl cyan-based monomer. Thereamong, it is preferred to add in an amount of 0.03 to 0.08 part by weight. When the ranges are satisfied, emulsion polymerization may be easily performed and a residual amount of the initiator in the graft copolymer may be minimized.

The emulsifier may be one or more selected from the group consisting of a $C_{12}$ to $C_{18}$ succinic acid metal salt, a sulfonic acid metal salt, a rosin acid alkali metal salt, a fatty acid alkali metal salt, and an alkali metal salt of a fatty acid dimer. Thereamong, a sulfonic acid metal salt is preferred.

The $C_{12}$ to $C_{18}$ succinic acid metal salt may be a $C_{12}$ to $C_{18}$ alkenylsuccinic acid dipotassium salt.

The sulfonic acid metal salt may be one or more selected from the group consisting of sodium dodecyl sulfate, sodium lauric sulfate, sodium octadecyl sulfate, sodium oleic sulfate, potassium dodecyl sulfate, sodium dodecyl benzene sulfonate, and potassium octadecyl sulfonate. Thereamong, sodium dodecyl benzene sulfonate is preferred.

The rosin acid alkali metal salt may be one or more selected from the group consisting of potassium rosinate and sodium rosinate. Thereamong, potassium rosinate is preferred.

The fatty acid alkali metal salt may be a $C_8$ to $C_{20}$ fatty acid alkali metal salt. More preferably, the fatty acid alkali metal salt is one or more selected from the group consisting of an alkali metal salt of capric acid, an alkali metal salt of lauric acid, an alkali metal salt of palmitic acid, an alkali metal salt of stearic acid, an alkali metal salt of oleic acid, and an alkali metal salt of linoleic acid.

The alkali metal salt of a fatty acid dimer may be an alkali metal salt of a $C_8$ to $C_{20}$ fatty acid dimer. The alkali metal salt of the fatty acid dimer is preferably a potassium salt of a $C_8$ to $C_{20}$ fatty acid dimer, more preferably a potassium salt of an oleic acid dimer.

The emulsifier may be added in an amount of 0.1 to 3 parts by weight or 0.5 to 2 parts by weight based on 100 parts by weight of the sum of the conjugated diene-based polymer, the cellulose nanocrystal, the alkyl (meth)acrylate-based monomer, the aromatic vinyl-based monomer, and the vinyl cyan-based monomer. Thereamong, an amount of 0.5 to 2 parts by weight is preferred. When the ranges are satisfied, excellent polymerization stability is exhibited while appropriately maintaining a reaction rate. In addition, discoloration and gas generation due to an emulsifier may be minimized.

The molecular weight regulator has been described above. Thereamong, t-dodecyl mercaptan is preferred.

The molecular weight regulator may be added in an amount of 0.1 to 0.6 part by weight or 0.2 to 0.5 part by weight based on 100 parts by weight of the sum of the conjugated diene-based polymer, the cellulose nanocrystal, the alkyl (meth)acrylate-based monomer, the aromatic vinyl-based monomer, and the vinyl cyan-based monomer. Thereamong, an amount of 0.2 to 0.5 part by weight is preferred. When the ranges are satisfied, a polymerization conversion rate of shells may be further increased while appropriately adjusting the weight average molecular weight of the shells, and a graft copolymer having a desired weight average molecular weight may be prepared.

The oxidation-reduction catalyst may be one or more selected from the group consisting of sodium formaldehyde sulfoxylate, ethylenediamine tetraacetic acid disodium salt, ferrous sulfate, dextrose, sodium pyrophosphate, anhydrous sodium pyrophosphate, and sodium sulfate. Thereamong, one or more selected from the group consisting of sodium formaldehyde sulfoxylate, ethylenediamine tetraacetic acid disodium salt, and ferrous sulfate is preferred.

The oxidation-reduction catalyst may be added in an amount of 0.01 to 0.1 part by weight or 0.02 to 0.09 part by weight based on 100 parts by weight of the sum of the conjugated diene-based polymer, the cellulose nanocrystal, the alkyl (meth)acrylate-based monomer, the aromatic vinyl-based monomer, and the vinyl cyan-based monomer. Thereamong, an amount of 0.02 to 0.09 part by weight is preferred. When the ranges are satisfied, polymerization may be easily initiated at a relatively low temperature.

Step 2 is a step of aging a polymerized product obtained in step 1 and additionally polymerizing unreacted monomers. A cellulose nanocrystal added in step 2 may react with the polymerized product and unreacted monomers obtained in step 1.

The cellulose nanocrystal may be added when a polymerization conversion rate is 40 to 50%.

The cellulose nanocrystal added in step 2 may be uniformly dispersed in the polymerized product and unreacted monomers obtained in step 1. As a result, the cellulose nanocrystal derivative is uniformly distributed in the graft copolymer, so that the graft copolymer may exhibit all of excellent transparency, chemical resistance, and mechanical characteristics.

Meanwhile, the cellulose nanocrystals may be polymerized with each other due to inherent characteristics. However, when the cellulose nanocrystal is added in step 2, it may minimize the polymerization of the cellulose nanocrystals, and an influence of the cellulose nanocrystal on graft-copolymerization of the conjugated diene-based polymer, the alkyl (meth)acrylate-based monomer, the aromatic vinyl-based monomer, and the vinyl cyan-based monomer may be minimized.

In step 2, the cellulose nanocrystal may be added batchwise or continuously.

After addition of the cellulose nanocrystal, aging and additional polymerization may be performed for 0.5 to 2 hours or 1 to 1.5 hours. Thereamong, it is preferred to perform aging and additional polymerization for 1 to 1.5 hours. When the conditions are satisfied, a polymerization conversion rate may be further increased.

Step 2 may be performed at a higher temperature than the temperature of step 1 and may be performed at 75° C. to 85° C. or 78° C. to 83° C. Thereamong, a temperature of 78° C. to 83° C. is preferred. When the conditions are satisfied, it is easy to adjust a polymerization temperature, and a polymerization rate may be appropriately adjusted. Accordingly, a copolymer having a uniform particle size may be prepared.

After completion of step 2, agglomeration, aging, washing, and drying processes may be further preformed, thereby obtaining a powder-type graft copolymer.

5. Thermoplastic Resin Composition

A thermoplastic resin composition according to still another embodiment of the present invention includes a matrix copolymer including an alkyl (meth)acrylate-based monomer unit, an aromatic vinyl-based monomer unit, and a vinyl cyan-based monomer unit; and a graft copolymer including a conjugated diene-based polymer, an alkyl (meth)acrylate-based monomer unit, an aromatic vinyl-based monomer unit, and a vinyl cyan-based monomer unit, wherein at least one of the matrix copolymer and the graft copolymer further includes a cellulose nanocrystal derivative.

A weight ratio of the matrix copolymer to the graft copolymer may be 50:50 to 20:80 or 50:50 to 25:75. Thereamong, a weight ratio of 50:50 to 25:75 is preferred. When the ranges are satisfied, a thermoplastic resin-molded article having all of excellent transparency, chemical resistance, impact resistance, and tensile strength may be manufactured.

A refractive index difference between the matrix copolymer and the graft copolymer may be 0 to 0.008 or 0 to 0.003. Thereamong, a refractive index difference of 0 to 0.003 is preferred. When the ranges are satisfied, a thermoplastic resin-molded article having excellent transparency may be manufactured.

Each of the matrix copolymer and the graft copolymer may have a refractive index of 1.51 to 1.52 or 1.512 to 1.518. Thereamong, a refractive index of 1.512 to 1.518 is preferred. When the ranges are satisfied, the refractive index of the matrix copolymer is similar to that of the graft copolymer and thus manufacturing a transparent thermoplastic resin-molded article may be manufactured.

Hereinafter, the present invention is described in detail so that those of ordinary skill in the art can easily carry out the present invention with reference to the following examples. As those skilled in the art would realize, the described embodiments may be modified in various different ways, all without departing from the spirit or scope of the present invention.

<Preparation of Aqueous Cellulose Nanocrystal Solution>

BGB Ultra™ Cellulose Nanocrystals Suspension manufactured by Blue Goose Biorefineries Inc., was used. Information on BGB Ultra™ Cellulose Nanocrystals Suspension is as follows.

Refractive index: An aqueous cellulose nanocrystal solution was irradiated with a visible ray of 589.3 nm, and the refractive index thereof was measured using an Abbe Refractometer. As a result, the refractive index was 1.47.

Concentration: 8% w/w

Solvent: reverse osmosis water

Length of primary particle: 100-150 nm (measurement method: TEM)

Diameter of primary particle: 9-14 nm (measurement method: TEM)

Diameter of secondary particle: 150 nm (measurement method: DLS)

<Preparation of Matrix Copolymer>

Examples 1 to 4 and Comparative Example 1

Polymerization was performed while continuously adding 30 parts by weight of toluene, 1 part by weight of 1,1-bis (t-butylperoxy)cyclohexane as an initiator, 0.15 part by weight of t-dodecyl mercaptan as a molecular weight regulator, and, in contents summarized in [Table 1] below, methyl methacrylate (MMA), styrene (SM), and acrylonitrile (AN) into a reactor at a constant rate for 3 hours. Here, a polymerization temperature was maintained at 148° C. Subsequently, an aqueous cellulose nanocrystal solution including 2 parts by weight of a cellulose nanocrystal (CNC: Cellulose NanoCrystal) was added to the reactor batchwise, and polymerization was performed for 2 hours, followed by terminating the polymerization. The obtained polymerized product was heated in a preliminary heating tank, and unreacted monomers and a solvent in the volatilization tank were volatilized. Next, a pellet-type matrix copolymer was prepared using a polymer transfer pump extruder maintained at 210° C.

<Preparation of Graft Copolymer>

Examples 5 to 8 and Comparative Example 2

Polymerization was preformed while continuously adding 1.0 part by weight of sodium dodecyl benzene sulfonate as an emulsifier, 0.04 part by weight of cumene hydroperoxide as an initiator, 0.3 part by weight of t-dodecyl mercaptan as a molecular weight regulator, 0.048 part by weight of sodium formaldehyde sulfoxylate as an oxidation-reduction catalyst, 0.012 part by weight of disodium ethylenediaminetetraacetic acid salt, 0.001 part by weight of ferrous sulfate, 100 parts by weight of ion-exchange water, and, in contents summarized in [Table 2], methyl methacrylate (MMA), styrene (SM), and acrylonitrile (AN) into a reactor containing 50 parts by weight (based on solids) of a butadiene rubber polymer latex (BD, average particle diameter: 300 nm, refractive index: 1.516, gel content: 70%) at 75° C. at a constant rate for 5 hours.

Subsequently, the temperature of the reactor was elevated to 80° C., and then an aqueous cellulose nanocrystal solution including 1 part by weight of a cellulose nanocrystal (CNC: Cellulose NanoCrystal) was added into the reactor batchwise, followed by performing aging for 1 hour. The reaction was terminated, thereby obtaining a graft copolymer latex. Here, a polymerization conversion rate of the graft copolymer latex was 98%.

An aqueous calcium chloride solution was added to the obtained graft copolymer latex, followed by coagulating, aging, washing, and drying processes. As a result, a graft copolymer powder was obtained.

<Preparation of Thermoplastic Resin Composition>

Examples 9 to 22 and Comparative Example 3

A matrix polymer and a graft copolymer, as summarized in Table 3, below were uniformly mixed, thereby preparing a thermoplastic resin composition.

Comparative Example 4

An aqueous cellulose nanocrystal solution including 60 parts by weight of the matrix copolymer of Comparative Example 1, 37 parts by weight of the graft copolymer powder of Comparative Example 2, and 3 parts by weight of a cellulose nanocrystal was uniformly mixed, thereby preparing a thermoplastic resin composition.

Experimental Example 1

The properties of the matrix copolymers of the examples and the comparative examples were evaluated according to the following methods. Results are summarized in [Table 1] below.

① Refractive index: A matrix copolymer was irradiated with a visible ray of 589.3 nm, and the refractive index thereof was measured using an Abbe Refractometer.

② Polymerization conversion rate (%): [(measured value TSC)/(theoretical value TSC)]×100

Measured value TSC: Solid content in matrix copolymer

Theoretical value TSC: Solid content of monomers and additives theoretically added during preparation of matrix copolymer ③ Weight average molecular weight (g/mol): Determined as a relative value to a standard polystyrene (PS) sample using tetrahydrofuran (THF) and gel permeation chromatography (GPC, Waters Breeze).

TABLE 1

| Classification | | Example 1 | Example 2 | Example 3 | Example 4 | Comparative Example 1 |
|---|---|---|---|---|---|---|
| Matrix copolymer | | A | B | C | D | E |
| Composition (parts by weight) | MMA | 66.5 | 64.0 | 61.5 | 59.0 | 69.0 |
| | SM | 24.5 | 25.0 | 25.5 | 24.0 | 24.0 |
| | AN | 7.0 | 7.0 | 7.0 | 7.0 | 7.0 |
| | CNC | 2.0 | 4.0 | 6.0 | 8.0 | — |
| ① Refractive index | | 1.516 | 1.516 | 1.516 | 1.516 | 1.516 |
| ② Polymerization conversion rate | | 60 | 59 | 61 | 60 | 61 |
| ③ Weight average molecular weight | | 109,000 | 109,500 | 110,000 | 115,000 | 110,000 |

Referring to Table 1, it was confirmed that the matrix copolymers of Examples 1 to 4 exhibited a refractive index, polymerization conversion rate, and weight average molecular weight almost the same as those of the matrix copolymer of Comparative Example 1. From these results, it was confirmed that the properties of the matrix copolymer were not affected even when a cellulose nanocrystal was added during the matrix copolymer preparation process.

Experimental Example 2

The properties of the graft copolymer powders of the examples and the comparative examples were evaluated according to the following methods. Results are summarized in [Table 2] below.

④ Refractive index: A graft copolymer powder was irradiated with a visible ray of 589.3 nm, and the refractive index thereof was measured using an Abbe Refractometer.

⑤ Graft ratio (%): A predetermined amount of graft copolymer was added to acetone, and the free graft copolymer was dissolved by vibrating for 24 hours using a vibrator (trade name: SI-600R, manufacturer: Lab. companion), followed by centrifuging for 1 hour at 14,000 rpm using a centrifuge to separate a supernatant (sol). Next, a precipitate (gel) was dried at 140° C. for 2 hours using a vacuum dryer (trade name: DRV320DB, manufacturer: ADVANTEC), thereby obtaining an insoluble fraction. The graft ratio (%) of the insoluble fraction was obtained according to the following equation:

Graft ratio (%)=[(Y−(X×R))/(X×R)]×100

X: Weight of graft copolymer added to obtain insoluble fraction

Y: Weight of insoluble fraction

R: Fraction of butadiene rubber polymer in graft copolymer to obtain insoluble fraction ⑥ Weight average molecular weight (g/mol) of shells: A sol separated according to the method described in the graft ratio measurement method was dried in a 50° C. hot air oven. Next, the dried sol was dissolved in a THF solution to prepare a solution (concentration: 0.1% by weight). The solution was filtered through a 0.1 μm filter. Finally, the weight average molecular weight of the filtrate was obtained using a GPC instrument (manufacturer: Waters).

TABLE 2

| Classification | | Example 5 | Example 6 | Example 7 | Example 8 | Comparative Example 2 |
|---|---|---|---|---|---|---|
| Graft copolymer | | A | B | C | D | E |
| Composition (parts by weight) | BD | 50.0 | 50.0 | 50.0 | 50.0 | 50.0 |
| | MMA | 31.0 | 30.0 | 28.0 | 24.0 | 32.0 |
| | SM | 11.0 | 11.2 | 12.0 | 12.5 | 11.0 |
| | AN | 7.0 | 7.0 | 7.0 | 7.0 | 7 |
| | CNC | 1.0 | 1.8 | 3.0 | 6.5 | — |
| ④ Refractive index | | 1.516 | 1.516 | 1.516 | 1.517 | 1.516 |
| ⑤ Graft ratio | | 43.76 | 44.51 | 44.50 | 45.00 | 43.50 |
| ⑥ Weight average molecular weight of shells | | 110,000 | 118,960 | 119,000 | 119,870 | 108,900 |

Referring to Table 2, it was confirmed that the refractive index and graft ratio of each of the graft copolymers of Examples 5 to 8 and the weight average molecular weight of shells thereof were almost the same as or higher than those of the graft copolymer of Comparative Example 2. From these results, it was confirmed that the properties of the graft copolymer were not affected even when a cellulose nanocrystal was added during the graft copolymer preparation process.

Experimental Example 3

The thermoplastic resin composition of each of the examples and the comparative examples, 2 parts by weight of ethylene bis(stearamide) as a lubricant, and 0.2 part by weight of a phosphate-based antioxidant were uniformly mixed, and then fed into a twin-screw extruder set at 230° C., followed by extruding the same. As a result, a pellet was prepared. The flow index of the pellet was measured according to the following method. Results are summarized in Tables 3 to 6 below.

⑦ Melt Flow Rates (g/10 min): Measured at 220° C. under a load of 10 kg according to ASTM D-1238.

Experimental Example 4

The pellet prepared in Experimental Example 3 was injection-molded at 230° C. and aged at 25° C. under a relative humidity condition of 50±5% for 12 hours, thereby manufacturing a specimen. The properties of the specimen were measured according to the following methods. Results are summarized in Tables 3 to 6 below.

⑧ Transparency (haze, %): The transparency of a sheet with a thickness of 3 mm was measured according to ASTM D-1003.

⑨ Change over time in oven ($\Delta E_1$): L, a, and b values of a specimen were measured, and the specimen was stored in a 80° C. oven for 7 days, followed by re-measuring the L, a, and b values. In addition, a discoloration degree was measured according to the following equation:

$$\Delta E_1 = \sqrt{(L_1'-L_{10})^2+(a_1'-a_{10})^2 \pm (b_1'-b_{10})^2}$$

wherein $L_1'$, $a_1'$ and $b_1'$ of a specimen were measured using the CIE LAB color coordinate system after storing the specimen in a 80° C. oven for 7 days, and $L_{10}$, $a_{10}$ and $b_{10}$ of the specimen were measured using the CIE LAB color coordinate system before storing the specimen in the oven.

⑩ Change during residence in injection molding machine ($\Delta E_2$): L, a, and b values of a specimen were measured, and then L, a, and b values of the specimen were re-measured after the specimen was left in a 250° C. injection molding machine for 15 minutes. In addition, a discoloration degree was evaluated according to the following equation:

$$\Delta E_2 = \sqrt{(L_2'-L_{20})^2+(a_2'-a_{20})^2+(b_2'-b_{20})^2}$$

wherein $L_2'$, $a_2'$ and $b_2'$ of a specimen were measured using the CIE LAB color coordinate system after the specimen was left in a 250° C. injection molding machine for 15 minutes, and $L_{20}$, $a_{20}$ and $b_{20}$ of the specimen were measured using the CIE LAB color coordinate system before the residence.

⑪ Notched Izod impact strength (kg·cm/cm, ¼ In): Measured according to ASTM D256.

⑫ Tensile strength (kgf/cm$^2$): Measured according to ASTM D638.

⑬ Chemical resistance: A tensile specimen was fixed on a 1.0% jig and then an isopropyl alcohol solution (concentration: 70%) was applied to the tensile specimen. After 10 minutes, a change in the tensile specimen was observed with the naked eye.

◎: No change, ○: Fine cracking occurs, Δ: Cracking occurs, ×: Fracturing occurs

TABLE 3

| | | Examples | | | |
|---|---|---|---|---|---|
| Classification | | 9 | 10 | 11 | 12 |
| Matrix copolymer (parts by weight) | Type | A | B | C | D |
| | Content | 60 | 60 | 60 | 60 |

TABLE 3-continued

|  | Classification | Examples | | | |
|---|---|---|---|---|---|
|  |  | 9 | 10 | 11 | 12 |
| Graft copolymer powder (parts by weight) | Type | E | E | E | E |
|  | Content | 40 | 40 | 40 | 40 |
| ⑦ Melt Flow Rates |  | 18.0 | 17.9 | 18.2 | 18.5 |
| ⑧ Transparency |  | 2.2 | 2.3 | 2.4 | 2.3 |
| ⑨ Change over time in oven |  | 3.0 | 3.1 | 3.0 | 3.1 |
| ⑩ Change during residence in injection molding machine |  | 3.2 | 3.1 | 3.0 | 3.8 |
| ⑪ Impact strength |  | 21.3 | 23.4 | 23.1 | 25.1 |
| ⑫ Tensile strength |  | 521 | 535 | 538 | 546 |
| ⑬ Chemical resistance |  | ◎ | ◎ | ◎ | ◎ |

TABLE 4

|  | Classification | Examples | | |
|---|---|---|---|---|
|  |  | 13 | 14 | 15 |
| Matrix copolymer (parts by weight) | Type | E | E | E |
|  | Content | 60 | 60 | 60 |
| Graft copolymer powder (parts by weight) | Type | B | C | D |
|  | Content | 40 | 40 | 40 |
| ⑦ Melt Flow Rates |  | 18.0 | 18.1 | 18.5 |
| ⑧ Transparency |  | 2.0 | 2.1 | 2.1 |
| ⑨ Change over time in oven |  | 3.2 | 3.3 | 3.2 |
| ⑩ Change during residence in injection molding machine |  | 3.4 | 3.4 | 3.3 |
| ⑪ Impact strength |  | 18.0 | 20.1 | 23.5 |
| ⑫ Tensile strength |  | 510 | 522 | 555 |
| ⑬ Chemical resistance |  | ○ | ◎ | ◎ |

TABLE 5

|  | Classification | Examples | | | |
|---|---|---|---|---|---|
|  |  | 16 | 17 | 18 | 19 |
| Matrix copolymer (parts by weight) | Type | A | B | C | D |
|  | Content | 60 | 60 | 60 | 60 |
| Graft copolymer powder (parts by weight) | Type | A | A | A | A |
|  | Content | 40 | 40 | 40 | 40 |
| ⑦ Melt Flow Rates |  | 17.9 | 18.0 | 18.5 | 18.6 |
| ⑧ Transparency |  | 2.1 | 2.1 | 2.2 | 2.3 |
| ⑨ Change over time in oven |  | 3.0 | 3.0 | 3.1 | 3.1 |
| ⑩ Change during residence in injection molding machine |  | 3.0 | 3.2 | 3.0 | 3.0 |
| ⑪ Impact strength |  | 20.5 | 22.9 | 23.7 | 26.8 |
| ⑫ Tensile strength |  | 528 | 540 | 558 | 575 |
| ⑬ Chemical resistance |  | ◎◎ | ◎◎ | ◎◎ | ◎◎ |

TABLE 6

|  | Classification | Examples | | | Comparative Examples | |
|---|---|---|---|---|---|---|
|  |  | 20 | 21 | 22 | 3 | 4 |
| Matrix copolymer (parts by weight) | Type | B | B | B | E | E |
|  | Content | 50 | 60 | 60 | 60 | 60 |
| Graft copolymer powder (parts by weight) | Type | B | B | C | E | E |
|  | Content | 50 | 40 | 40 | 40 | 37 |
| CNC (parts by weight) |  | — | — | — | — | 3 |
| ⑦ Melt Flow Rates |  | 18.5 | 17.9 | 18.2 | — | 18.5 |
| ⑧ Transparency |  | 2.0 | 2.2 | 2.2 | 2 | 12.0 |
| ⑨ Change over time in oven |  | 3.1 | 3.1 | 3.1 | 3.6 | — |
| ⑩ Change during residence in injection molding machine |  | 3.0 | 3.1 | 3.0 | 3.8 | — |
| ⑪ Impact strength |  | 21.1 | 23.1 | 23.3 | 17.0 | 19.5 |
| ⑫ Tensile strength |  | 516 | 544 | 551 | 498 | 520 |
| ⑬ Chemical resistance |  | ◎◎ | ◎◎ | ◎◎ | X | ◎◎ |

Referring to Tables 3 to 6, it was confirmed that the specimens of Examples 9 to 12 manufactured using the thermoplastic resin compositions that included the matrix copolymer including the cellulose nanocrystal derivative and the graft copolymer excluding the cellulose nanocrystal derivative exhibited almost the same flow index and transparency as those of the specimen of Comparative Example 3 manufactured using the thermoplastic resin composition that included the graft copolymer and matrix copolymer excluding the cellulose nanocrystal derivative, but exhibited an excellent change over time in an oven, an excellent change during residence in an injection molding machine, and excellent impact strength, tensile strength, and chemical resistance. In addition, it was confirmed that a change over time in an oven, a change during residence in an injection molding machine, impact strength, tensile strength, and chemical resistance were further improved with an increasing content of the cellulose nanocrystal added to prepare the matrix copolymer. In addition, it was confirmed that the specimens of Examples 13 to 15 manufactured using the thermoplastic resin compositions that included the matrix copolymer excluding the cellulose nanocrystal derivative and the graft copolymer including the cellulose nanocrystal derivative exhibited almost the same flow index and transparency as those of the specimen of Comparative Example 3 manufactured using the thermoplastic resin composition that included the graft copolymer and matrix copolymer excluding the cellulose nanocrystal derivative, but exhibited an excellent change over time in an oven, an excellent change during residence in an injection molding machine, and excellent impact strength, tensile strength, and chemical resistance. In addition, it was confirmed that a change over time in an oven, a change during residence in an injection molding machine, impact strength, tensile strength, and chemical resistance were further improved with an increasing content of the cellulose nanocrystal added to prepare the graft copolymer.

In addition, it was confirmed that the specimens of Examples 16 to 22 manufactured using the thermoplastic resin compositions that included the graft copolymer and matrix copolymer including the cellulose nanocrystal derivative exhibited almost the same flow index and transparency as those of the specimen of Comparative Example 3 manufactured using the thermoplastic resin composition that included the graft copolymer and matrix copolymer excluding the cellulose nanocrystal derivative, but exhibited excellent change over time in an oven, excellent change during residence in an injection molding machine, and excellent impact strength, tensile strength, and chemical resistance. In addition, it was confirmed that a change over time in an oven, a change during residence in an injection molding machine, impact strength, tensile strength, and chemical resistance were further improved with an increasing content of the cellulose nanocrystal added to prepare the graft copolymer or the matrix copolymer.

Meanwhile, in the case of the thermoplastic resin composition of Comparative Example 4 including the aqueous cellulose nanocrystal solution as a separate component, the cellulose nanocrystal was accumulated in a screw of an extruder during a pellet manufacturing process, whereby it was difficult to continuously perform extrusion. Accordingly, the pellet of Comparative Example 4 was not extruded enough to measure a change over time in an oven and a change during residence in an injection molding machine. As a result, a change over time in an oven and a change during residence of the pellet of Comparative Example 4 were not measured. In addition, since the cellulose nanocrystal was present in the form of an aqueous solution, the pellet was carbonized due to water, and thus, transparency was significantly decreased.

The invention claimed is:

1. A matrix copolymer, comprising:
a cellulose nanocrystal derivative;
an alkyl (meth)acrylate-based monomer unit;
an aromatic vinyl-based monomer unit; and
a vinyl cyan-based monomer unit,
wherein the cellulose nanocrystal derivative is formed through a reaction between a cellulose nanocrystal and one or more selected from the group consisting of an alkyl (meth)acrylate-based monomer, an aromatic vinyl-based monomer, and a vinyl cyan-based monomer added during preparation of the matrix copolymer.

2. The matrix copolymer according to claim 1, wherein the matrix copolymer has a refractive index of 1.51 to 1.52.

3. The matrix copolymer according to claim 1, wherein the cellulose nanocrystal has a refractive index of 1.4 to 1.5.

4. The matrix copolymer according to claim 1, wherein the cellulose nanocrystal are secondary particles comprising a plurality of primary particles,
wherein the primary particles have an average diameter of 5 to 20 nm and an average length of 50 to 200 nm, and the secondary particles have an average diameter of 100 to 200 nm.

5. A graft copolymer, comprising:
a cellulose nanocrystal derivative;
a conjugated diene-based polymer;
an alkyl (meth)acrylate-based monomer unit;
an aromatic vinyl-based monomer unit; and
a vinyl cyan-based monomer unit,
wherein the cellulose nanocrystal derivative is formed through a reaction between a cellulose nanocrystal and one or more selected from the group consisting of the conjugated diene-based polymer, an alkyl (meth)acrylate-based monomer, an aromatic vinyl-based monomer, and a vinyl cyan-based monomer added to prepare the graft copolymer.

6. The graft copolymer according to claim 5, wherein the graft copolymer has a refractive index of 1.51 to 1.52.

7. The graft copolymer according to claim 5, wherein the cellulose nanocrystal has a refractive index of 1.4 to 1.5.

8. The graft copolymer according to claim 5, wherein the cellulose nanocrystal are secondary particles comprising a plurality of primary particles,
wherein the primary particles have an average diameter of 5 to 20 nm and an average length of 50 to 200 nm, and the secondary particles have an average diameter of 100 to 200 nm.

9. A thermoplastic resin composition, comprising:
a matrix copolymer comprising an alkyl (meth)acrylate-based monomer unit, an aromatic vinyl-based monomer unit, and a vinyl cyan-based monomer unit; and
a graft copolymer comprising a conjugated diene-based polymer, an alkyl (meth)acrylate-based monomer unit, an aromatic vinyl-based monomer unit, and a vinyl cyan-based monomer unit,
wherein at least one of the matrix copolymer and the graft copolymer further comprises a cellulose nanocrystal derivative, and
wherein the cellulose nanocrystal derivative is formed through a reaction between a cellulose nanocrystal and one or more selected from the group consisting of the conjugated diene-based polymer, an alkyl (meth)acrylate-based monomer, an aromatic vinyl-based monomer, and a vinyl cyan-based monomer added during preparation of the matrix copolymer or the graft copolymer.

10. The thermoplastic resin composition according to claim 9, wherein a refractive index difference between the matrix copolymer and the graft copolymer is 0 to 0.008.

* * * * *